B. A. HAYCOCK.
Improvement in Draught-Promoters.

No. 114,291.   Patented May 2, 1871.

WITNESSES.
Gustave Dieterich
L. S. M'Babee

INVENTOR
B. A. Haycock
Per: Munn & Co
ATTORNEYS.

United States Patent Office.

BENJAMIN A. HAYCOCK, OF RICHLAND, IOWA.

Letters Patent No. 114,291, dated May 2, 1871.

IMPROVEMENT IN DRAUGHT-PROMOTERS.

The Schedule referred to in these Letters Patent and making part of the same.

*To all whom it may concern:*

Be it known that I, BENJAMIN A. HAYCOCK, of Richland, in the county of Keokuk and State of Iowa, have invented a new and improved Draught-Promoter; and I do hereby declare that the following is a full, clear, and exact description thereof, which will enable others skilled in the art to make and use the same, reference being had to the accompanying drawing forming part of this specification.

This invention relates to improvements in apparatus for supplying the air to steam-generating and other furnaces, and consists in an arrangement under the grates of a number of tubes having long narrow orifices for admitting the air, which is preferably supplied by a fan or other forcing apparatus, the said tubes being peculiarly constructed for preventing ashes from falling into them, as hereinafter described.

Figure 1:
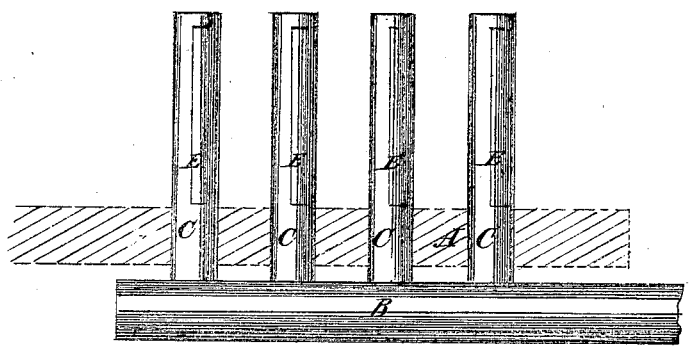
Figure 2:
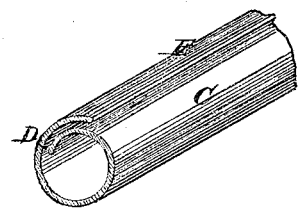

Figure 1 is plan view of a system of pipes arranged according to my improvement, and Figure 2 is a perspective view of a section of one of the pipes, showing the construction of the same, for preventing the ashes from falling into them.

Similar letters of reference indicate corresponding parts.

A represents in dotted lines a horizontal section of the front furnace-wall, and B the main air-supply pipe leading from any competent air-blower.

C represents the air-discharging pipes which I propose to attach to B and pass through furnace-wall A under the fire-grate, arranging them as close together as may be found best, and extending them to the rear end of the grate or nearly so.

In these pipes, near the upper parts, I arrange narrow slots, extending from the front wall to the rear ends, for the escape of the air in thin blasts to the fire for distributing it as much as possible under the whole area of the grate.

In order to prevent the ashes, cinders, and the like falling into the pipes I arrange the shell to lap at the opening, as shown at D, fig. 2, and extend the upper lip E a little beyond the vertical center, so that the matter falling over it will roll down the side of the pipe.

This application of the air I find much more effective and economical in fuel than any other.

I propose to employ as many of the pipes as may be found best, and to make such other changes in the arrangement as may be required by the nature of the case in hand.

Having thus described my invention,

I claim as new and desire to secure by Letters Patent—

The pipe C, constructed as described, with the lip at one side of the longitudinal orifice projecting over and beyond the other lip on the opposite side of said orifice, as represented at D, whereby the matter falling over the edges E will be caused to roll down the sides of the pipe, substantially as described.

BENJAMIN A. HAYCOCK.

Witnesses:
  H. WIGHTMAN,
  JOHN WASSON.